US006866218B2

(12) United States Patent
Liao

(10) Patent No.: US 6,866,218 B2
(45) Date of Patent: Mar. 15, 2005

(54) WIRE WINDING BOX

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 0 days.

(21) Appl. No.: 10/441,167

(22) Filed: May 20, 2003

(65) Prior Publication Data

US 2004/0232267 A1 Nov. 25, 2004

(51) Int. Cl.[7] .............................................. B65H 78/48
(52) U.S. Cl. .................................. 242/378.1; 242/385.4
(58) Field of Search ......................... 242/378.1, 378.2, 242/378.3, 385.4; 191/12.2 R, 12.2 A, 12.4

(56) References Cited

U.S. PATENT DOCUMENTS

| | | | | |
|---|---|---|---|---|
| 4,443,944 A | * | 4/1984 | Beesley ................... | 242/385.4 |
| 5,014,437 A | * | 5/1991 | Sun ........................... | 242/385.4 |
| 5,178,619 A | * | 1/1993 | Galazaka ................... | 242/385.4 |
| 6,315,231 B1 | * | 11/2001 | Liaom ........................ | 242/378.1 |
| 6,378,797 B1 | * | 4/2002 | Liao .......................... | 242/378.1 |

* cited by examiner

*Primary Examiner*—John M. Jillions
(74) *Attorney, Agent, or Firm*—Rosenberg, Klein & Lee

(57) ABSTRACT

A wire winding box used for winding a wire includes a bottom cover, a upper cover, a rotating disk, a spiral spring and a control button. Therein, the upper cover has an opening; the rotating disk has a central hole and a stopping ring; the spiral spring is disposed between the rotating disk and the bottom cover; the control button is capable of moving upwardly or downwardly within the opening of the upper cover and indentations of the stopping ring; a position restricting structure is formed between the control button and the upper cover. The control button is disposed within the opening of the upper cover and the central hole of the rotating disk to integrate the necessary functions and components of the wire winding box so as to reduce the volume of the wire winding box.

18 Claims, 10 Drawing Sheets

WIRE WINDING BOX

FIELD OF THE INVENTION

The present invention is directed to a wire winding box, and more particularly, to a wire winding box that uses a spiral spring to retract a wire.

BACKGROUND OF THE INVENTION

In accordance with the prior art, communication equipment, e.g. telephone and facsimile machines, usually use extended lines to transmit signals to each other. Further, the local area network (LAN), e.g. computers set up in a company, also need extended lines to transmit signals between the computers. Therein, due to the disposition of the communication equipment, the extended lines are usually too long so that portions of the extended lines are left disorderly on the ground or gathered beside tables. It is not only messy and unsightly but also wastes space. Moreover, the lengthy extended wire malfunctions easily due to improper pulling and dragging. Hence, the lengthy extended wire should be further arranged, e.g. employing a wire winding box to wind the redundant portion, to keep the environment orderly and keep the communication equipment functioning well.

The conventional wire winding box as shown in FIG. 1 is a prior invention of the inventor of the present invention that is patented in Taiwan with serial number 395403. It includes a bottom cover 10', rotating disk 20', spiral spring 30', stopping base 40', control button 50' and upper cover 60'. Therein, the bottom cover 10' has a disk tank 12' formed in its center, a containing tank 14' and fixing tank 16'. The spiral spring 30' is disposed in the containing tank 14' and the control button 50' is disposed in the fixing tank 16'. The rotating disk 20' is disposed in the disk tank 12' of the bottom cover 10'. The stopping base 40' is disposed in a circular containing portion 22' formed in the center of the rotating disk 20' and is used to wind a wire A. The upper cover 60' is disposed on the bottom cover 10'.

While the wire A is pulled out, the spiral spring 30' will also be pulled out by the circular containing portion 22'. Due to the interaction of stopping blocks 24' formed in the periphery of the rotating disk 20' and a projective block 56' of the control button 50', the rotating disk 20' is restricted to rotate in a single direction only. While the control button 50' is pressed to make the projective block 56' release the stopping blocks 24' of the rotating disk 20', the spiral spring 30' will retract back to the containing tank 14' and simultaneously make the rotating disk 20' wind the wire A.

In the conventional wire winding box mentioned above, except the disk tank, the bottom cover has the containing tank and fixing tank disposed thereon to contain the spiral spring and control button, respectively. The containing tank and fixing tank will waste space and make the volume of the wire winding box increase.

Accordingly, as discussed above, the conventional wire winding box still has some drawbacks that could be improved. The present invention aims to resolve the drawbacks in the prior art.

SUMMARY OF THE INVENTION

A main objective of the present invention is to provide a wire winding box, whose components and functions are integrated to reduce its entire volume.

For reaching the objective above, the present invention provides a wire winding box used to wind a wire, including a bottom cover, upper cover, rotating disk, spiral spring and control button. Therein, the bottom cover has a fixing tank. The upper cover is assembled with the bottom cover to form an outer housing and a disk tank within the outer housing. The upper cover has an opening corresponding to the fixing tank of the bottom cover. The periphery of the outer housing has wire outlets formed thereon and ends of the wire are disposed within a corresponding one of the wire outlets. The rotating disk is disposed in the disk tank. The rotating disk has a stopping ring and a central hole formed thereon. The central hole is aligned to the opening of the upper cover and concentric with the stopping ring. The stopping ring has an inner edge with stopping blocks and indentations. The wire has a middle portion secured on the rotating disk and is wound between the rotating disk and the upper cover. One end of the spiral spring is secured on the outer housing. The other end of the spiral spring is secured on the rotating disk. The spiral spring is disposed between the rotating disk and the bottom cover. The control button has a button portion, which is capable of moving upwardly or downwardly within the opening of the upper cover. The button portion has a lower end contacted with an elastic component. The elastic component is passed through the central hole of the rotating disk and disposed within the fixing tank of the bottom cover. The button portion has a periphery with projective blocks, which are capable of being wedged by the stopping blocks of the rotating disk and moving upwardly and downwardly via the indentations of the rotating disk. A position restricting structure is formed between the control button and the upper cover. Thereby, while the projective blocks are wedged by the stopping blocks, the rotating disk is restricted to rotate only in a single direction for pulling out the wire and simultaneously tightening the spiral spring. While the control button is pressed to make the projective block pass through the indentations, the spiral spring is released to make the rotating disk rotate in a reverse direction for retracting the wire.

Numerous additional features, benefits and details of the present invention are described in the detailed description, which follows.

DETAILED DESCRIPTION

Figure 1:
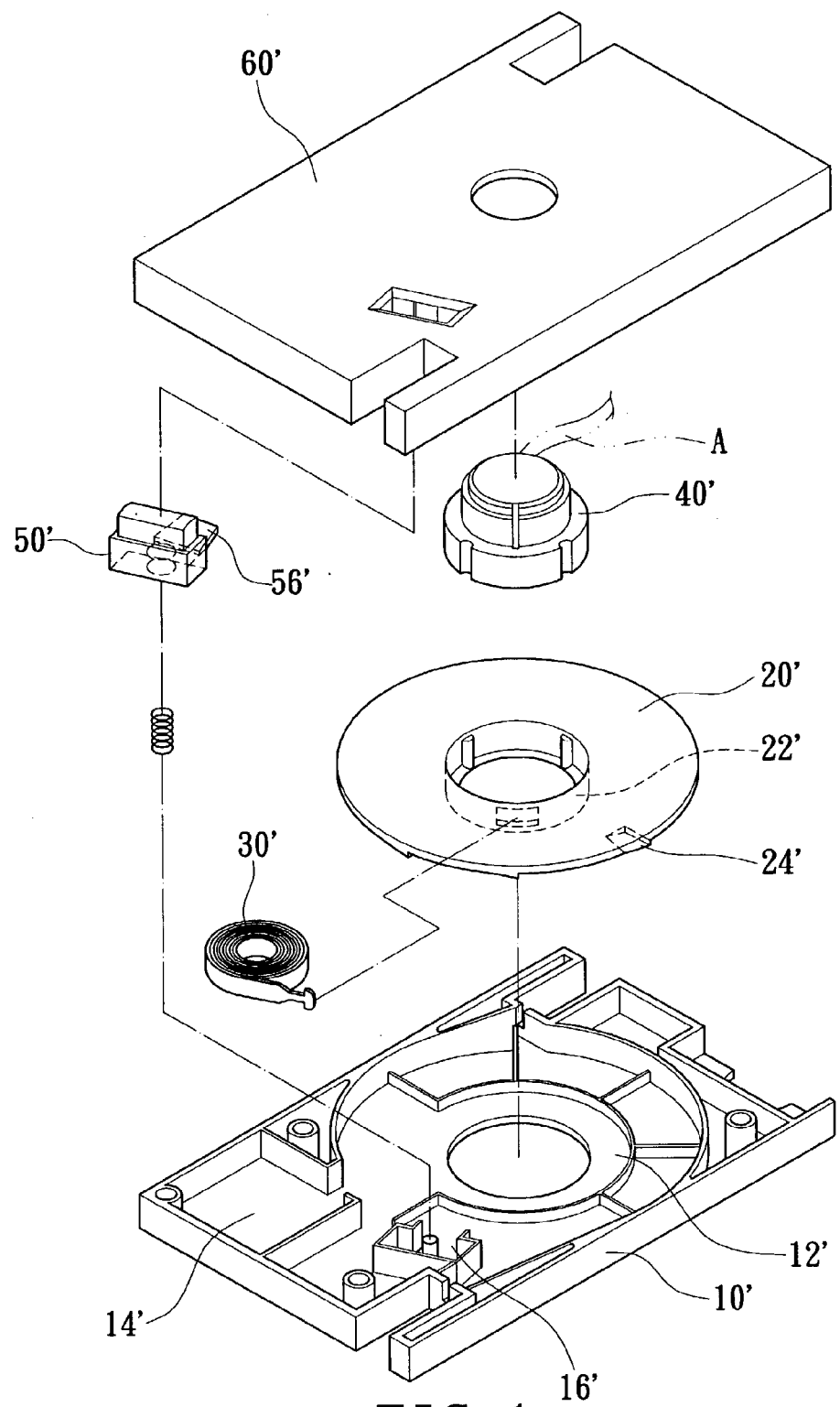
FIG. 1 is a exploded view of the conventional wire winding box.
Figure 2:
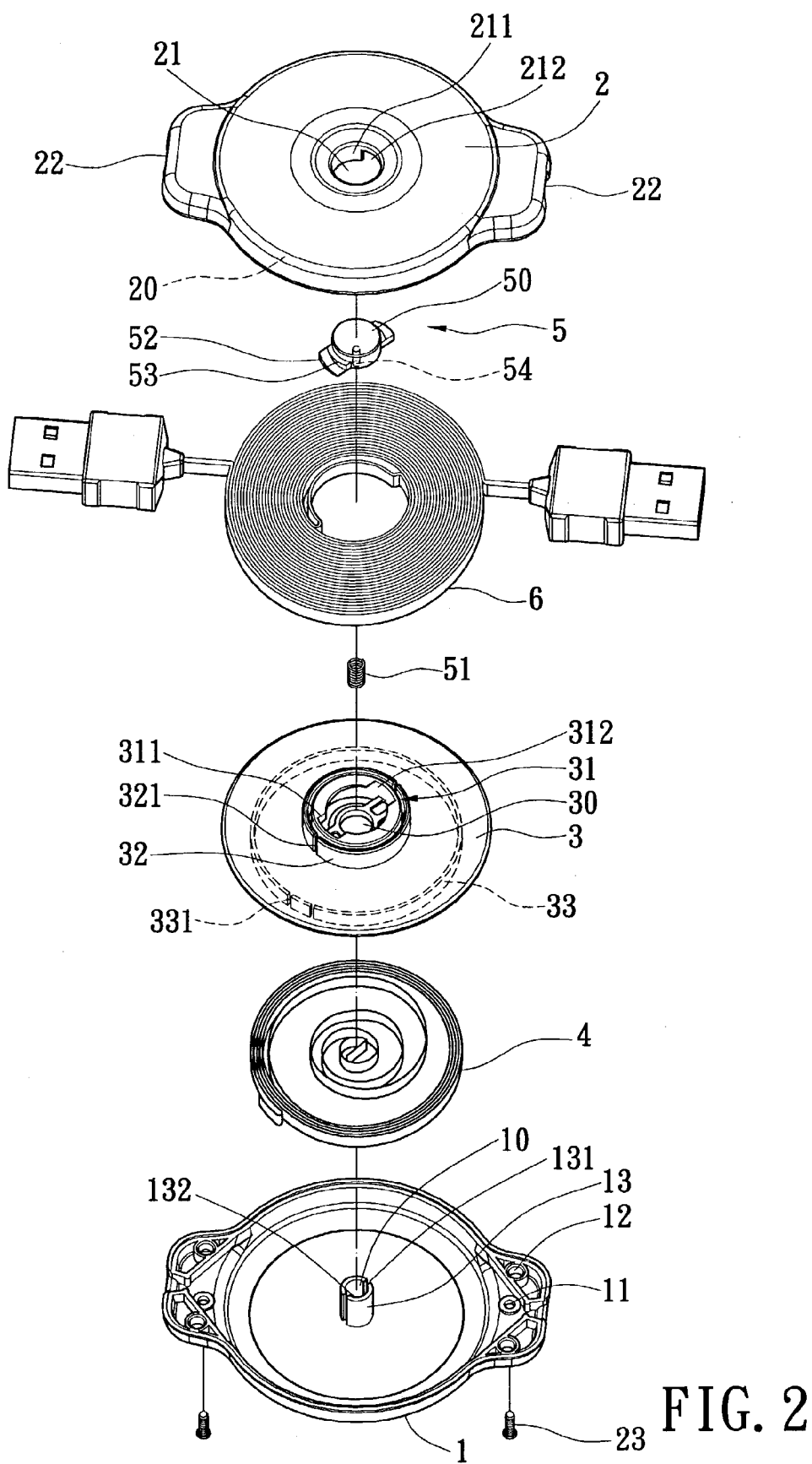
FIG. 2 is a exploded view of the first embodiment complied with the present invention.
Figure 3:
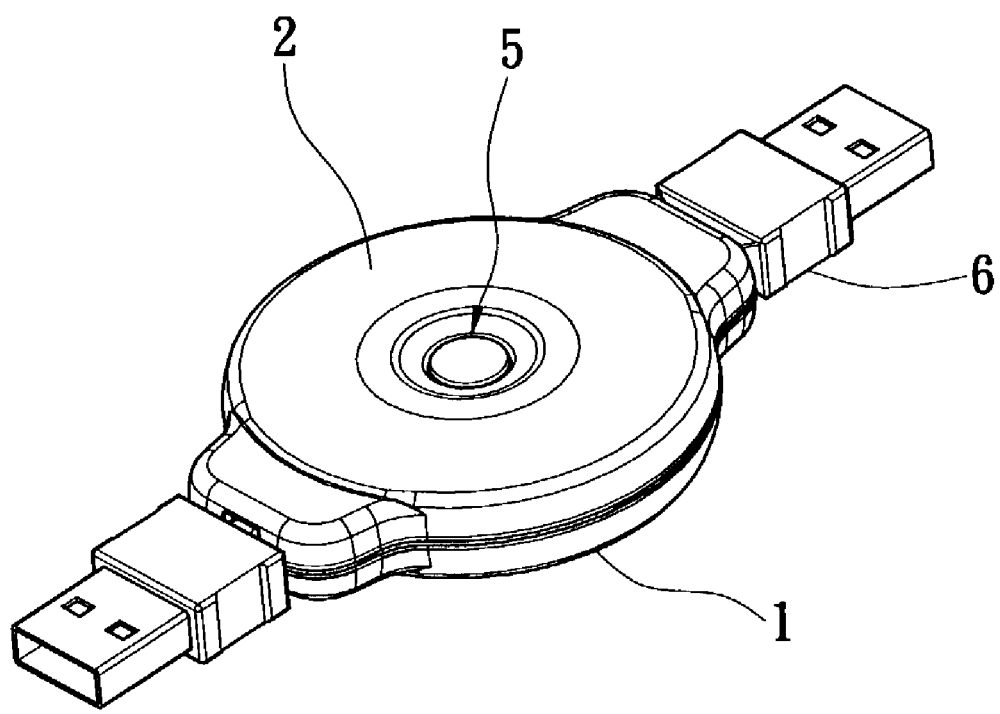
FIG. 3 is a perspective view of the first embodiment complied with the present invention.
Figure 4:
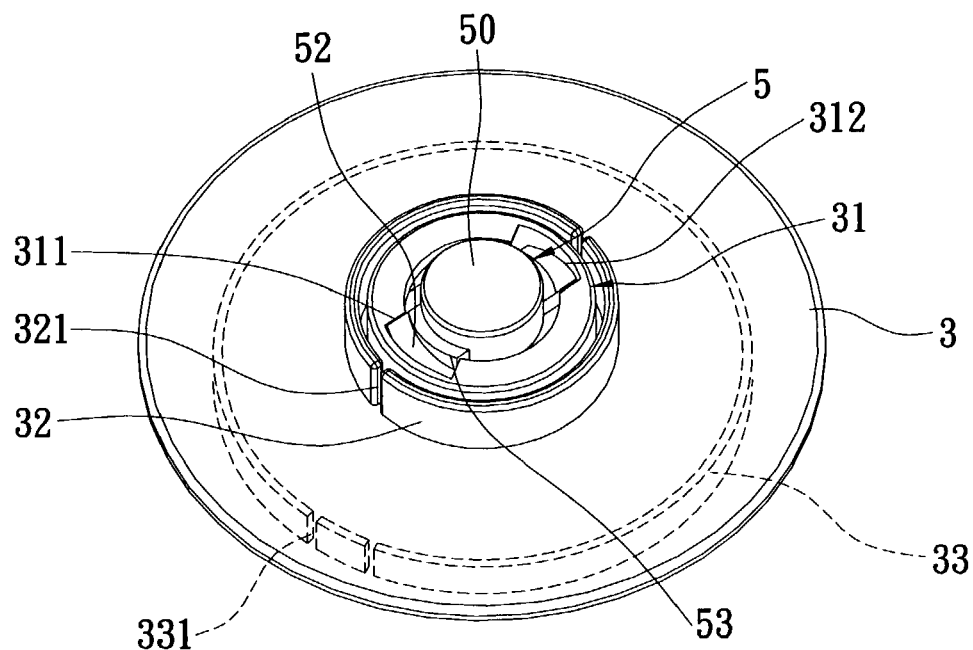
FIG. 4 is a schematic view of the first embodiment while the control button isn't pressed.
Figure 5:
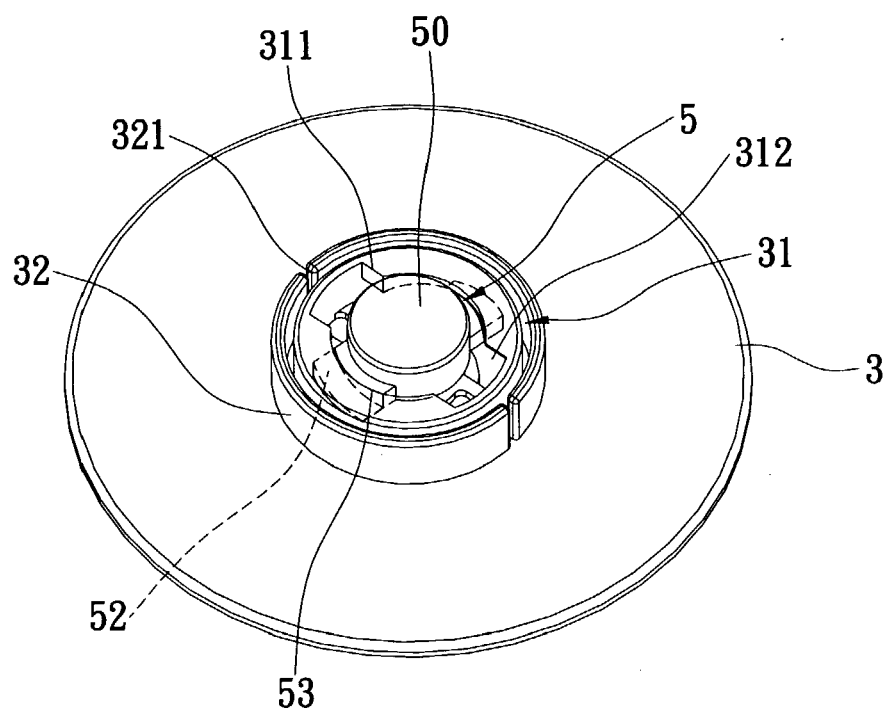
FIG. 5 is a schematic view of the first embodiment while the control button is pressed.
Figure 6:
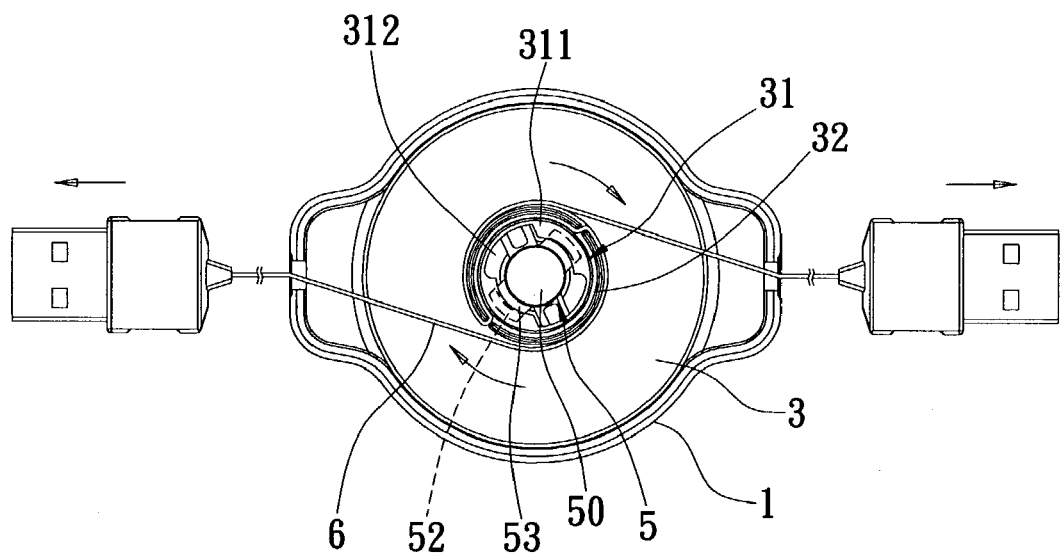
FIG. 6 is a schematic view of the first embodiment while the wire is pulled out.
Figure 7:
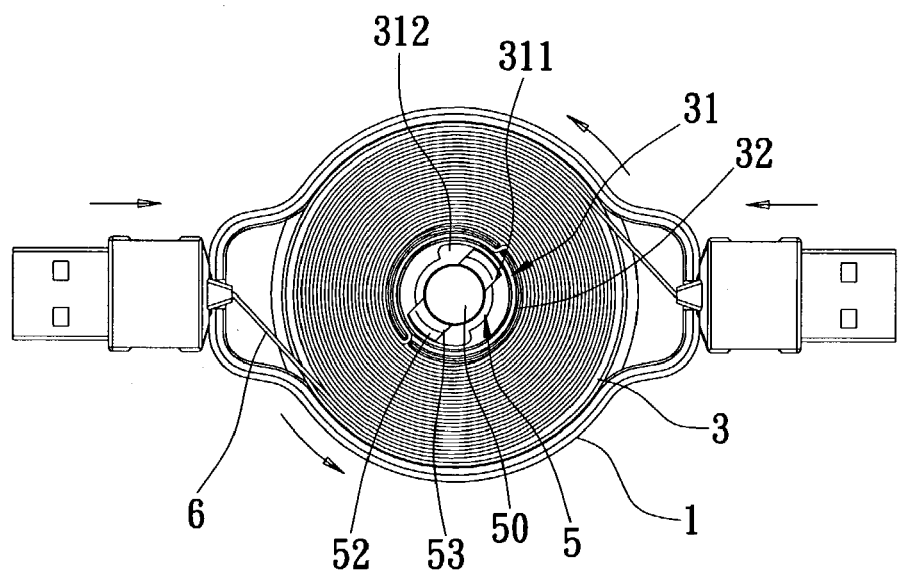
FIG. 7 is a schematic view of the first embodiment while the wire is retracted.

Please refer to FIGS. 2 and 3. The present invention provides a wire winding box used for winding a wire 6, including a bottom cover 1, upper cover 2, rotating disk 3, spiral spring 4 and control button 5.

Therein, the bottom cover 1 has a fixing tank 10, thread holes 11 and concave portions 12.

The upper cover 2 is assembled with the bottom cover 1 to form an outer housing and a disk tank 20 within the outer housing. The upper cover 2 has an opening 21 corresponding to the fixing tank 10 of the bottom cover 1. The periphery of the outer housing has wire outlets 22 formed thereon and ends of the wire 6 are disposed within a corresponding one of the wire outlets 22. Additionally, the upper cover 2 has convex portions and thread bases (not shown). Each of the convex portions is used to dispose in a corresponding one of the concave portions 12 for positioning. The thread holes 11 and thread bases are used for screws 23 to pass through and screw thereon.

The rotating disk 3 is disposed in the disk tank 20. The rotating disk 3 has a stopping ring 31 and a central hole 30 formed thereon. The central hole 30 is aligned to the opening 21 of the upper cover 2 and is concentric with the stopping ring 31. The stopping ring 31 has an inner edge with stopping blocks 311 and indentations 312 between the stopping blocks 311. The bottom sides of the stopping blocks 311 are inclines. The wire 6 has a middle portion secured on the rotating disk 3 and is wound between the rotating disk 3 and the upper cover 2. Therein, the upper side of the rotating disk 3 has the stopping ring 31. The rotating disk 3 has a fixing portion 32 disposed outside the stopping ring 31. The fixing portion has slits 321 formed thereon. The wire 6 is passed through and secured by the slits 321. The wire 6 is wound on the outer side of the fixing portion 32.

The spiral spring 4 has two ends. One end of the spiral spring 6 is secured on the outer housing. The other end of the spiral spring 6 is secured on the rotating disk 3. The spiral spring 4 is disposed between the rotating disk 3 and the bottom cover 1. The bottom cover 1 has a tube portion 13. The fixing tank 10 is formed in the tube portion 13. The tube portion 13 is passed through the central hole 30 of the rotating disk 3. The tube portion 13 has slits 131 and the end of the spiral spring 4 secured on the outer housing is secured by the slits 131. The tube portion 13 has clipping pieces 132. The spiral spring 4 is clipped by the clipping pieces 132. The bottom side of the rotating disk 3 has an outer ring 33. The outer ring 33 has slit 331, and the end of the spiral spring 4 secured on the rotating disk 3 is secured by the slits 331. The spiral spring 4 is disposed within the outer ring 33.

The control button 5 has a button portion 50, which is capable of moving upwardly or downwardly within the opening 21 of the upper cover 2. The button portion 50 has a lower end contacted with an elastic component 51. The elastic component 51 is passed through the central hole 30 of the rotating disk 3 and disposed within the fixing tank 10 of the bottom cover 1. The lower end of the elastic component 51 is contacted with the upper edges of the clipping pieces 132. The button portion 50 has a periphery with projective blocks 52, which are capable of being wedged by the stopping blocks 311 of the rotating disk 3 and moving upwardly and downwardly via the indentations 312 of the rotating disk 3. The upper sides of the projective blocks 52 of the control button 5 are inclines. The inclines of the stopping blocks 311 is matched with the inclines of the projective blocks 52. A position restricting structure is formed between the control button 5 and the upper cover 2. The position restricting structure refers to restricting indentations 212 and restricting pieces 211 disposed on the inward side of the periphery of the opening 21 of the upper cover 2, the inward side facing the rotating disk 3. A restricting portion 53 is disposed between the projective block 52 and the button portion 50 of the control button 5. The restricting portion 53 is capable of moving upward or downward within the restricting indentation 212 while the button portion 50 of the control button 5 is capable of moving upwardly or downwardly between the restricting pieces 211. The bottom side of the control button 5 has a position pole 54. The position pole 54 is capable of moving upwardly or downwardly within the central hole 30 of the rotating disk 3 and the fixing tank 10 of the bottom cover 1.

The bottom side of the control button 5 is contacted with the elastic components 51. The elastic component 51 is passed through the central hole 30 of the rotating disk 3 and disposed within the fixing tank 10 of the bottom cover 1 to form a position recovering structure between the control button 5 and the bottom cover 1.

The projective blocks of the button portion 50 of the control button 5 are wedged by the stopping blocks 311 of the stopping ring 31 of the rotating disk 3, or moved upwardly or downwardly within the indentations 312 of the stopping ring 31 to form a clutch structure between the control button 5 and the rotating disk 3.

Please refer to FIG. 4 to 7. When the wire 6 is wound completely between the rotating disk 3 and the upper cover 2, the spiral spring 4 will be disposed between the rotating disk 3 and the bottom cover 1 with loose status. When the wire 6 is pulled out, the wire 6 will result in the rotation of the rotating disk 3 so as to tighten the spiral spring 4 to generate an elasticity of retraction. Due to the interaction of the inclines of the stopping block 311 and the projective block 52 as well as the effect of the elastic component 51, the control button 5 will move upwardly or downwardly. When the wire 6 is released, the elastic component 51 will prop the control button 5 to make the restricting portions 53 of the control button 5 stay in the restricting indentations 212 and be positioned by the restricting pieces 211. At the same time, the projective block 52 will wedge the stopping block 311 to keep the spiral spring 4 tightened so that the wire 6 will not retract. When the button portion 50 of the control button 5 is pressed, the projective blocks 52 will be parted from the stopping blocks 311 of the rotating disk 3 and the spiral spring 4 will retract to rotate the rotating disk 3 in a reverse direction and wind the wire 6 automatically.

Thereby, in the clutch structure, while the projective blocks 52 of the control button 5 are wedged by the stopping blocks 311, the rotating disk 3 is restricted to rotate only in a single direction for pulling out the wire 6 and simultaneously tightening the spiral spring 4. While the control button 5 is pressed to make the projective block 52 to pass through the indentations 312, the spiral spring 4 is released to make the rotating-disk 3 to rotate in a reverse direction for retracting the wire 6 automatically.

The control button 5 is disposed within the opening 21 of the upper cover 2 and the central hole 30 of the rotating disk 3 to control the retraction of the wire 6. The spiral spring 4 is disposed at the bottom side of the rotating disk 3. Hence, the components and functions of the wire winding box can be simplified and integrated, respectively. Then the volume of the wire winding box can be reduced.

Figure 8:
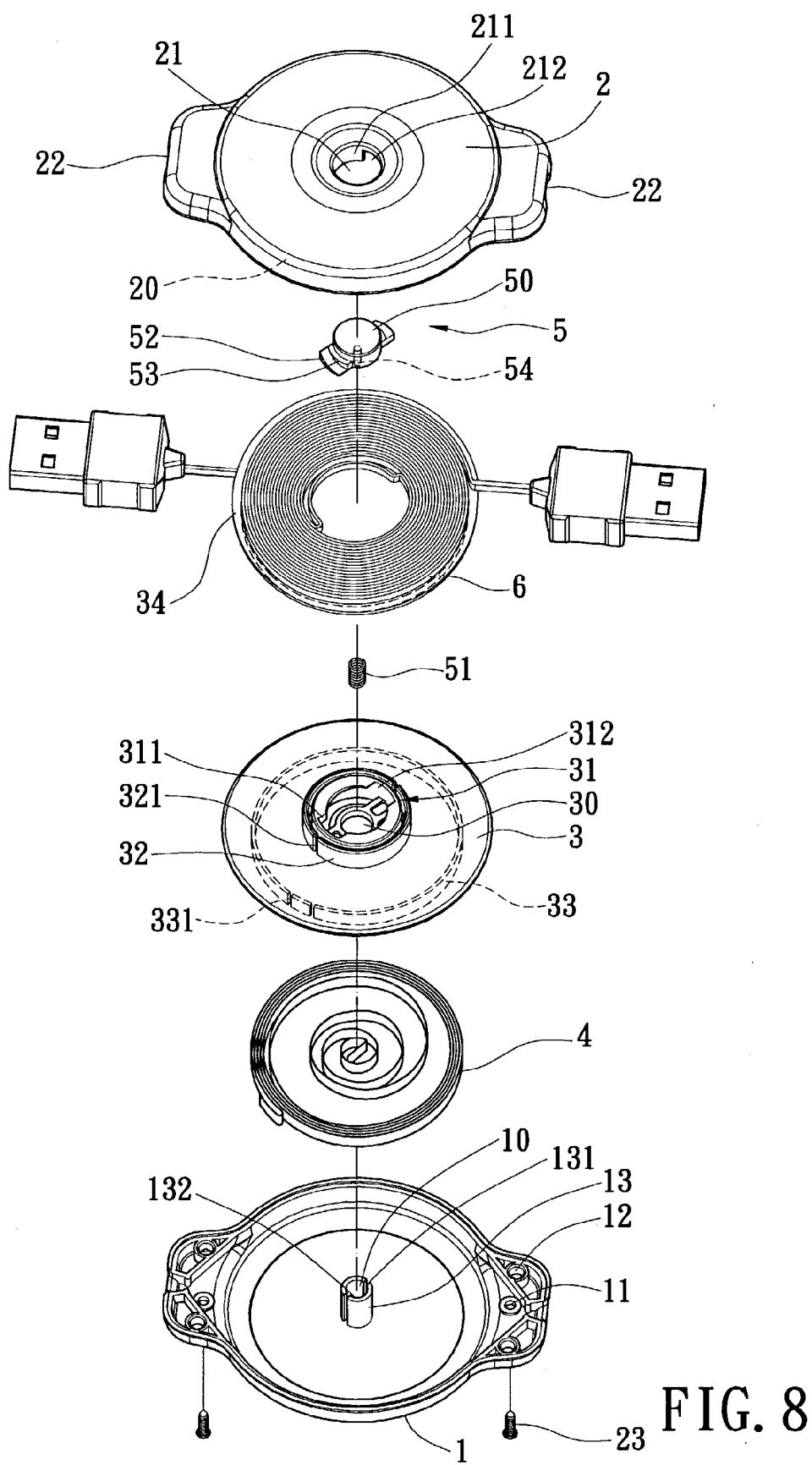
FIG. 8 is a exploded view of the second embodiment complied with the present invention.
Figure 9:
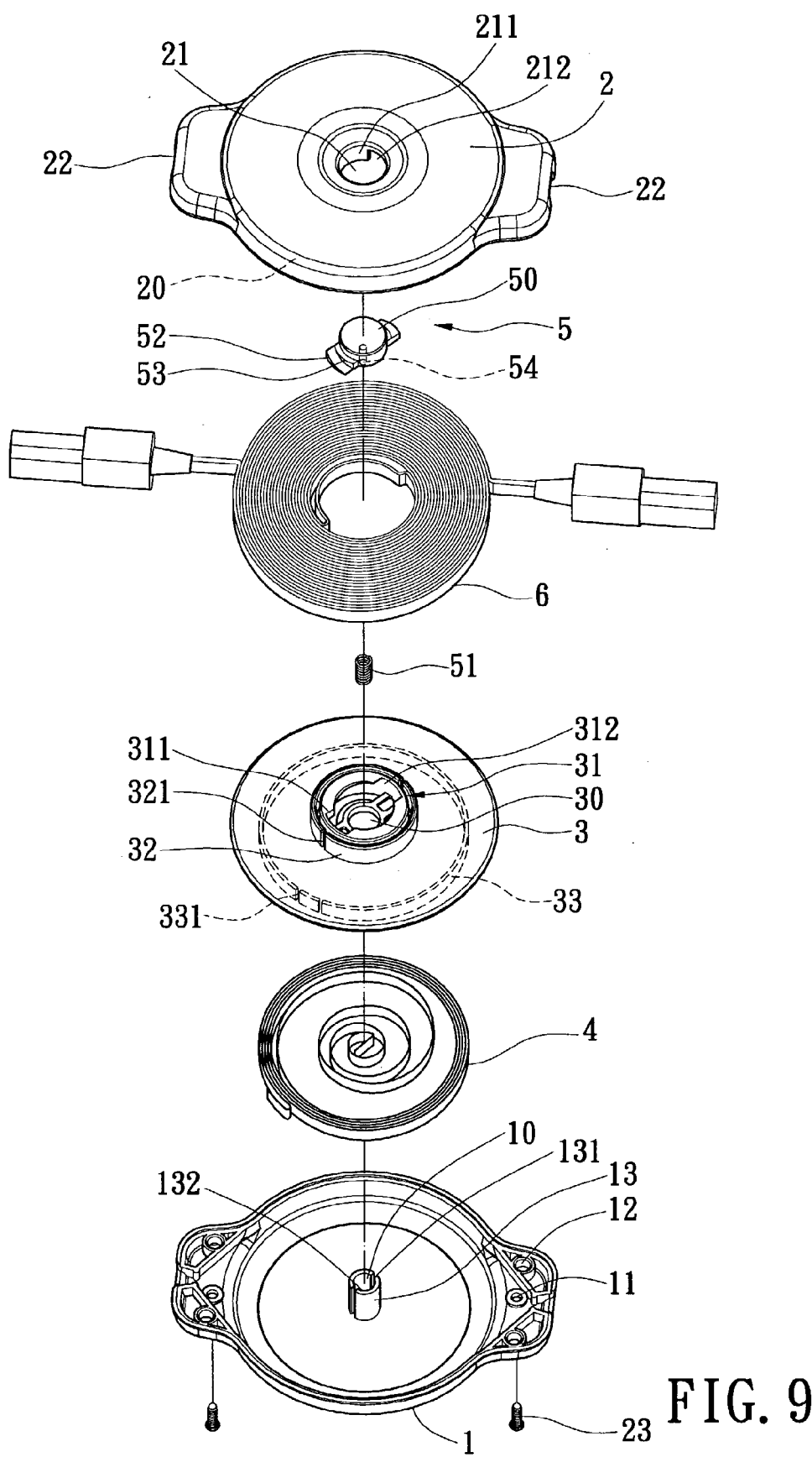
FIG. 9 is a exploded view of the third embodiment complied with the present invention.
Figure 10:
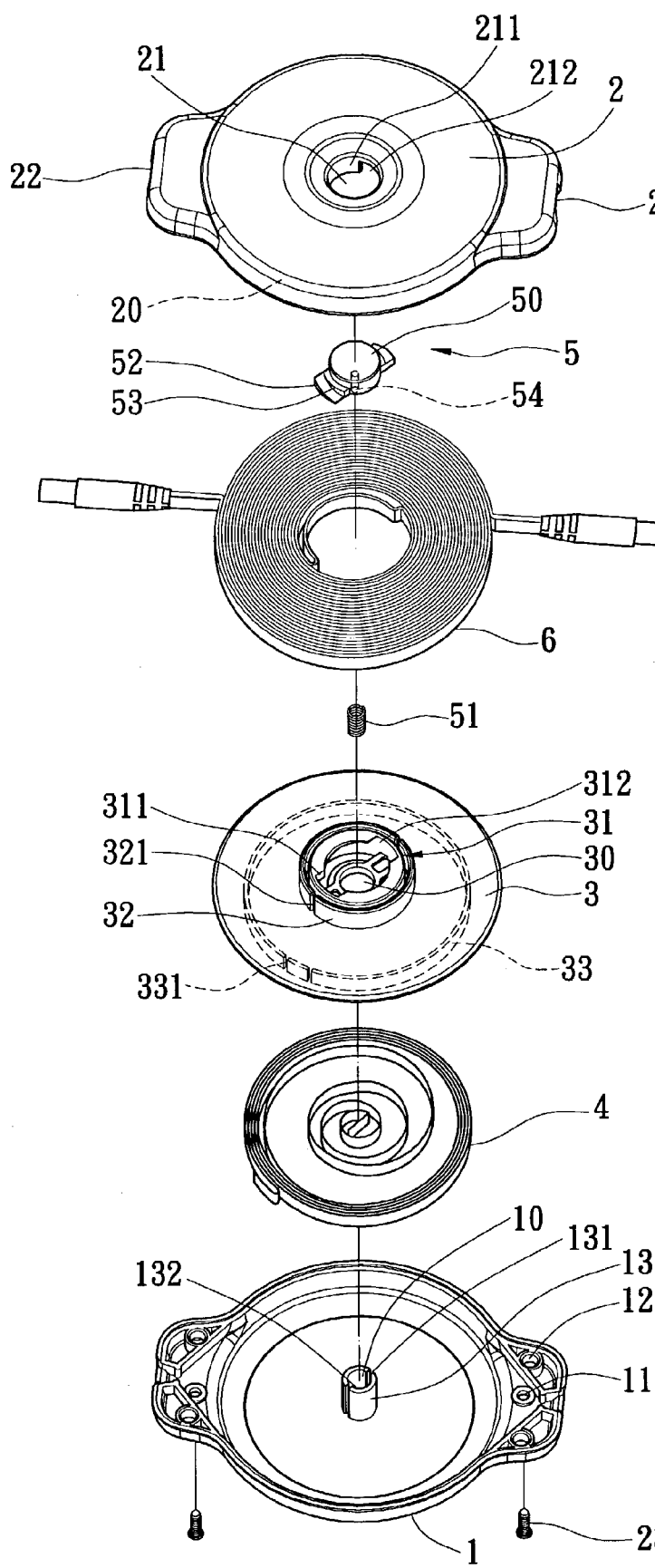
FIG. 10 is a exploded view of the fourth embodiment complied with the present invention.
Figure 11:
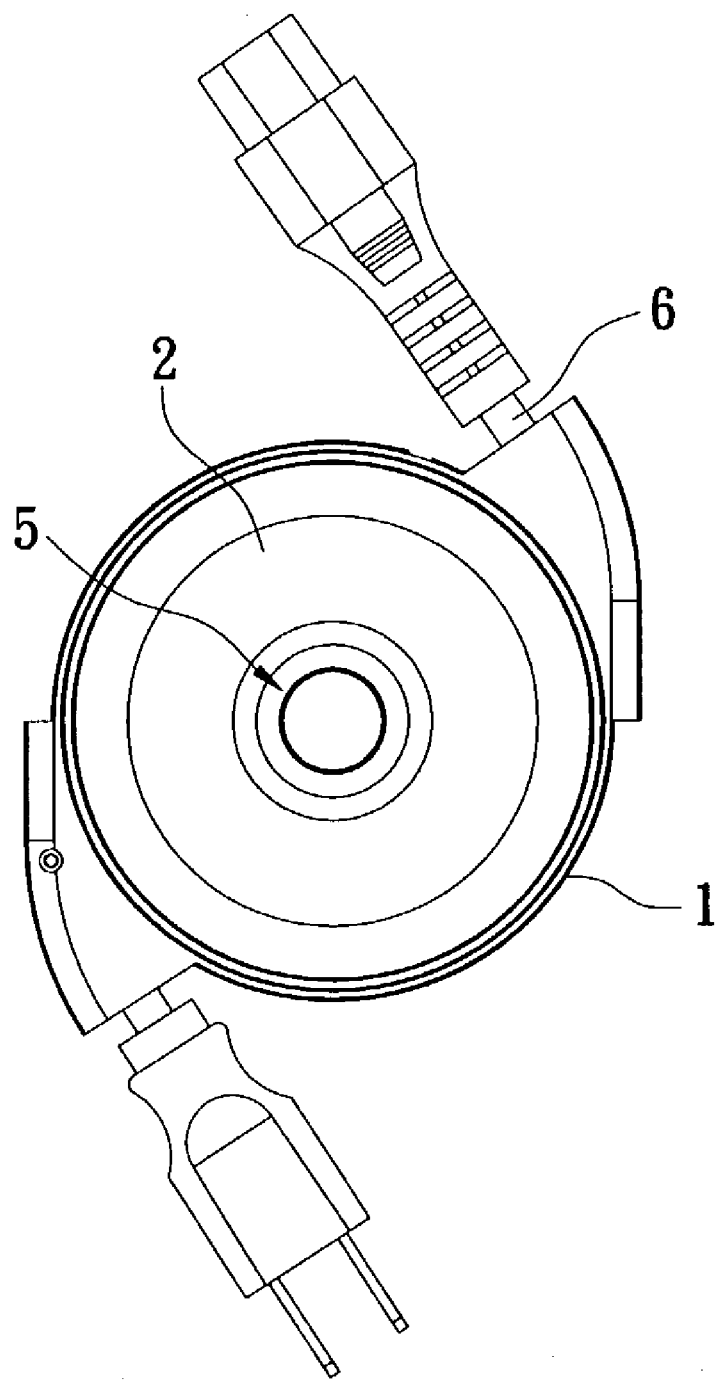
FIG. 11 is a schematic view of the fifth embodiment complied with the present invention.

Please refer to FIG. 2 and FIG. 8 to 11. The terminals of the wire 6 can be universal serial bus (USB) connecters, connecters with 1394 standard or electrical plugs. Further, as shown in FIG. 8, the wire 6 can be wound as two layers separated by a partition plate 34.

Figure 12:
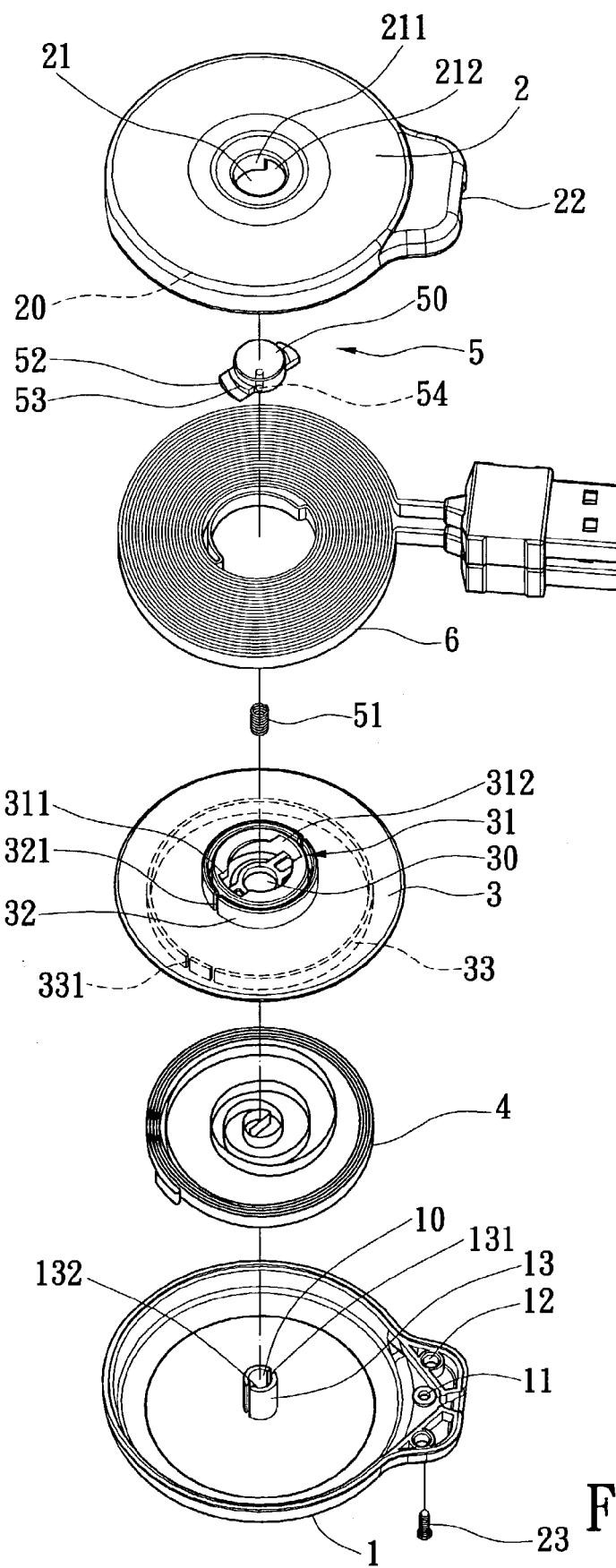
FIG. 12 is a exploded view of the sixth embodiment complied with the present invention.

Please refer to FIG. 12. The bottom cover 1 and upper cover 2 are assembled to form an outer housing and a disk tank 20. The upper cover 2 has an opening 21. The periphery of the outer housing has a wire outlet 22 formed thereon and the ends of the wire 6 are disposed within the wire outlet 22. The rotating disk 3 is disposed in the disk tank 20. The rotating disk 3 has a central hole 30 formed thereon. The central hole 30 is aligned to the opening 21 of the upper cover 2. The wire 6 is secured on the rotating disk 3 and wound between the rotating disk 3 and the outer housing. The spiral spring 4 has an end secured on the outer housing and another end secured on the rotating disk 3. The spiral spring 4 is disposed between the rotating disk 3 and the bottom cover 1. The control button 5 has a button portion 50. The button portion 50 is capable of moving upwardly or downwardly within the opening 21 of the outer housing. A position recovering structure and position restricting structure are formed between the control button 5 and the outer housing. A clutch structure is formed between the control button 5 and the rotating disk 3.

Therefore, the wire winding box of the present invention has following features:

(1) The control button is disposed within the opening of the upper cover and the central hole of the rotating disk and is combined with the upper cover to form the position restricting structure, combined with the rotating disk to form the clutch structure and combined with the bottom cover to form the position recovering structure. Hence, the structures of the necessary functions of the wire winding box are integrated. The components of the wire winding box is simplified. Then, the volume of the wire winding box is reduced.

(2) The spiral spring is disposed at one side of the rotating disk and concentric with the rotating disk to make the volume of the wire winding box be reduced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A wire winding box used for winding a wire, comprising:
   a bottom cover, which has a fixing tank;
   an upper cover, which is assembled with the bottom cover to form an outer housing and a disk tank within the outer housing, the upper cover having an opening corresponding to the fixing tank of the bottom cover, a periphery of the outer housing having wire outlets formed thereon and ends of the wire each being disposed within a corresponding one of the wire outlets;
   a rotating disk, which is disposed in the disk tank, the rotating disk having a stopping ring and a central hole formed thereon, the central hole being aligned to the opening of the upper cover and being concentric with the stopping ring, the stopping ring having an inner edge with stopping blocks and indentations, the wire having a middle portion secured on the rotating disk and being wound between the rotating disk and the upper cover;
   a spiral spring, which has an end secured on the outer housing and another end secured on the rotating disk, the spiral spring being disposed between the rotating disk and the bottom cover; and
   a control button, which has a button portion, the button portion being capable of moving upwardly or downwardly within the opening of the upper cover, the button portion having a lower end contacted with an elastic component, the elastic component being passed through the central hole of the rotating disk and disposed within the fixing tank of the bottom cover, the button portion having a periphery with projective blocks, the projective blocks capable of being wedged by the stopping blocks and moving upwardly and downwardly via the indentations, the control button and the upper cover forming a position restricting structure therebetween;
   whereby the rotating disk is restricted to rotate in a single direction for pulling out the wire and tightening the spiral spring simultaneously while the projective blocks are wedged by the stopping blocks; the spiral spring is released to make the rotating disk rotate in a reverse direction for retracting the wire while the control button is pressed to make the projective blocks pass through the indentations.

2. The wire winding box as claimed in claim 1, wherein the bottom cover has concave portions and the upper cover has convex portions, each of the convex portions being disposed in a corresponding one of the concave portions for positioning.

3. The wire winding box as claimed in claim 1, wherein the bottom cover and the upper cover respectively have thread holes and thread bases that are suitable for screws to pass through and screw thereon.

4. The wire winding box as claimed in claim 1, wherein the bottom cover has a tube portion, the fixing tank being formed in the tube portion, the tube portion being passed through the central hole of the rotating disk, the tube portion having slits and the end of the spiral spring secured on the outer housing being secured by the slits.

5. The wire winding box as claimed in claim 4, wherein the tube portion has clipping pieces, the spiral spring being clipped by the clipping pieces and a lower end of the elastic component being contacted with upper edges of the clipping pieces.

6. The wire winding box as claimed in claim 1, wherein a bottom side of the rotating disk has an outer ring, the outer ring having slits and the end of the spiral spring secured on the rotating disk being secured by the slits, the spiral spring being disposed within the outer ring.

7. The wire winding box as claimed in claim 1, wherein an upper side of the rotating disk has the stopping ring, the rotating disk having a fixing portion disposed outside the stopping ring, the fixing portion having slits, the wire passing through and being secured by the slits, and the wire being wound on an outer side of the fixing portion.

8. The wire winding box as claimed in claim 1, wherein bottom sides of the stopping blocks are inclines and upper sides of the projective blocks of the control button are also inclines, the inclines of the stopping blocks being matched with the inclines of the projective blocks.

9. The wire winding box as claimed in claim 1, wherein the position restricting structure includes restricting indentations and restricting pieces disposed on an inward side of a periphery of the opening of the upper cover, the inward side facing the rotating disk, a restricting portion being disposed between the projective blocks and the button portion of the control button, the restricting portion being capable of moving upward or downward within the restricting indentation and the button portion of the control button being capable of moving upward or downward between the restricting pieces.

10. The wire winding box as claimed in claim 1, wherein the a bottom side of the control button has a position pole, the position pole being capable of moving upward or downward within the central hole of the rotating disk and the fixing tank of the bottom cover.

11. A wire winding box used for winding a wire, the box comprising:
- a bottom cover;
- an upper cover, which is assembled with the bottom cover to form an outer housing and a disk tank within the outer housing, the upper cover having an opening, a periphery of the outer housing having wire outlets formed thereon and ends of the wire each being disposed within a corresponding one of the wire outlets;
- a rotating disk, which is disposed in the disk tank, the rotating disk having a central hole formed thereon, the central hole being aligned to the opening of the upper cover, the wire having a middle portion secured on the rotating disk and being wound between the rotating disk and the upper cover;
- a spiral spring, which has an end secured on the outer housing and another end secured on the rotating disk, the spiral spring being disposed between the rotating disk and the bottom cover; and
- a control button, which has a button portion, the button portion being capable of moving upwardly or downwardly within the opening of the upper cover, the control button and the bottom cover forming a position recovering structure therebetween, the control button and the upper cover forming a position restricting structure therebetween, the control button and the rotating disk forming a clutch structure therebetween;
- whereby the rotating disk is restricted to rotate in a single direction for pulling out the wire and tightening the spiral spring simultaneously by employing the clutch structure; the spiral spring is released to make the rotating disk rotate in a reverse direction for retracting the wire while the control button is pressed to make the clutch structure be separated.

12. The wire winding box as claimed in claim 11, wherein the bottom cover has concave portions and the upper cover has convex portions, each of the convex portions being disposed in a corresponding one of the concave portions for positioning.

13. The wire winding box as claimed in claim 11, wherein the bottom cover and the upper cover respectively have thread holes and thread bases that are suitable for screws to pass through and screw thereon.

14. The wire winding box as claimed in claim 11, wherein the bottom cover has a tube portion, the tube portion being passed through the central hole of the rotating disk, the tube portion having slits and the end of the spiral spring secured on the outer housing being secured by the slits.

15. The wire winding box as claimed in claim 14, wherein the tube portion has clipping pieces, the spiral spring being clipped by the clipping pieces.

16. The wire winding box as claimed in claim 11, wherein a bottom side of the rotating disk has an outer ring, the outer ring having slits and the end of the spiral spring secured on the rotating disk being secured by the slits, the spiral spring being disposed within the outer ring.

17. The wire winding box as claimed in claim 11, wherein an upper side of the rotating disk has a fixing portion, the fixing portion having slits, the wire passing through and being secured by the slits, and the wire being wound on an outer side of the fixing portion.

18. A wire winding box used for winding a wire, the box comprising:
- an outer housing, which forms a disk tank therein, a periphery of the outer housing having wire outlets formed thereon and ends of the wire each being disposed within a corresponding one of the wire outlets;
- a rotating disk, which is disposed in the disk tank, the rotating disk having a central hole formed thereon, the central hole being aligned to an opening of the outer housing, the wire being secured on the rotating disk and being wound between the rotating disk and the outer housing;
- a spiral spring, which has an end secured on the outer housing and another end secured on the rotating disk, the spiral spring being disposed between the rotating disk and the outer housing; and
- a control button, which has a button portion, the button portion being capable of moving upwardly or downwardly within the opening of the outer housing, the control button and the outer housing forming a position recovering structure and a position restricting structure therebetween, the control button and the rotating disk forming a clutch structure therebetween;

whereby the rotating disk is restricted to rotate in a single direction for pulling out the wire and tightening the spiral spring simultaneously by employing the clutch structure; the spiral spring is released to make the rotating disk rotate in a reverse direction for retracting the wire while the control button is pressed to make the clutch structure be separated.

* * * * *